US011028851B2

(12) United States Patent
Diekmann et al.

(10) Patent No.: US 11,028,851 B2
(45) Date of Patent: Jun. 8, 2021

(54) LIQUID PUMP INCLUDING AN IMPELLER CONNECTED DIRECTLY TO A ROTOR RECEIVING SLEEVE

(71) Applicant: Mahle International GmbH, Stuttgart (DE)

(72) Inventors: Johannes Diekmann, Schorndorf (DE); Michael Krappel, Stuttgart (DE); Andrej Rul, Stuttgart (DE)

(73) Assignee: Mahle International GmbH

( * ) Notice: Subject to any disclaimer, the term of this patent is extended or adjusted under 35 U.S.C. 154(b) by 301 days.

(21) Appl. No.: 15/914,829

(22) Filed: Mar. 7, 2018

(65) Prior Publication Data
US 2018/0258944 A1    Sep. 13, 2018

(30) Foreign Application Priority Data
Mar. 8, 2017 (DE) .......................... 102017203833.0

(51) Int. Cl.
*F04D 13/06* (2006.01)
*H02K 5/128* (2006.01)
(Continued)

(52) U.S. Cl.
CPC ............. *F04D 13/06* (2013.01); *F04D 25/06* (2013.01); *F04D 25/0606* (2013.01);
(Continued)

(58) Field of Classification Search
CPC .. F04D 29/2266; F04D 13/06; F04D 25/0606; F04D 29/20; F04D 25/06;
(Continued)

(56) References Cited

U.S. PATENT DOCUMENTS 7,074,019 B2    7/2006  Knoll
7,101,158 B2 *  9/2006  Hembree ............... F04D 13/025
                                                    417/420
(Continued)

FOREIGN PATENT DOCUMENTS

CN    101802411 A    8/2010
CN    102072168 A    5/2011
(Continued)

OTHER PUBLICATIONS

English Translation of DE102015210703; taken from EPO website Oct. 21, 2020 (Year: 2020).*
(Continued)

*Primary Examiner* — Bryan M Lettman
(74) *Attorney, Agent, or Firm* — Fishman Stewart PLLC

(57) ABSTRACT

A fluid pump for conveying a fluid may include an internal rotor rotatable about an axis of rotation relative to an external stator and an impeller connected to the internal rotor in a rotationally fixed manner configured to convey a fluid. The internal rotor may include a rotor receiving sleeve having a base body. The base body may include a receiving chamber configured to receive an anchor unit. The internal rotor may further include a bearing bushing penetrating the rotor receiving sleeve coaxially to the axis of rotation. The bearing bushing may be configured to receive a rotor shaft. The impeller may be directly connected to the rotor receiving sleeve in a rotationally fixed manner.

26 Claims, 4 Drawing Sheets

(51) Int. Cl.
*F04D 29/22* (2006.01)
*F04D 25/06* (2006.01)
*F04D 29/047* (2006.01)
*F04D 29/20* (2006.01)
*H02K 1/30* (2006.01)
*H02K 7/14* (2006.01)

(52) U.S. Cl.
CPC ......... *F04D 29/0473* (2013.01); *F04D 29/20* (2013.01); *F04D 29/2261* (2013.01); *H02K 1/30* (2013.01); *H02K 5/128* (2013.01); *H02K 5/1285* (2013.01); *H02K 7/14* (2013.01)

(58) Field of Classification Search
CPC ............... F04D 29/186; F04D 29/2222; F04D 29/2261; F04D 29/043; F04D 29/0473; F04D 49/20; H02K 7/14; H02K 1/27–1/2793; H02K 9/00; H02K 9/06; H02K 7/08; H02K 7/083; F16C 17/02; F16C 17/10
See application file for complete search history.

(56) References Cited

U.S. PATENT DOCUMENTS

| | | |
|---|---|---|
| 2011/0033320 A1 | 2/2011 | Heier et al. |
| 2011/0116947 A1 | 5/2011 | Yi et al. |
| 2015/0369248 A1* | 12/2015 | Noguchi ................ H02K 15/03 417/420 |

FOREIGN PATENT DOCUMENTS

| | | |
|---|---|---|
| DE | 10152497 A1 | 5/2003 |
| DE | 102015210703 | * 12/2016 |
| DE | 102015210703 A1 | 12/2016 |
| WO | 2009/037019 A1 | 3/2009 |

OTHER PUBLICATIONS

English abstract for DE-102015210703.
Chinese Office Action dated Jun. 24, 2020 for copending Chinese Application No. 201810190189.3.

* cited by examiner

LIQUID PUMP INCLUDING AN IMPELLER CONNECTED DIRECTLY TO A ROTOR RECEIVING SLEEVE

CROSS-REFERENCE TO RELATED APPLICATIONS

This application is a continuation in part and claims priority to German Patent Application No. DE 10 2017 203 833.0, filed on Mar. 8, 2017, the contents of which are hereby incorporated by reference in its entirety.

TECHNICAL FIELD

The present invention relates to a fluid pump for conveying a fluid, in particular for a motor vehicle. In addition, the invention relates to a method for installing an impeller on a rotor of an electric motor, in particular for producing such a fluid pump.

BACKGROUND

A fluid pump serves to convey a fluid, in particular of water. For this purpose, the fluid pump on principle has an impeller, which conveys the fluid to be conveyed by means of a rotational movement. A plurality of such fluid pumps, which substantially have an electric motor and such an impeller arranged thereon, is generally known from the prior art. The electric motor or a so-called wet rotor, respectively, can at least partially be in direct contact with the fluid.

A pump rotor for a canned motor pump is known from WO 2009/037019 A1, which has a one-piece base body comprising an impeller base disk and a rotor holder bushing, wherein a rotor unit comprising rotor magnets is arranged on the rotor holding bushing.

A generic fluid pump is known from DE 101 52 497 A1. A similar fluid pump is known from DE 10 2015 210 703 A1.

SUMMARY

The present invention deals with the problem of specifying an improved or at least a different embodiment for a fluid pump of the above-described type or for a combination equipped therewith respectively, which is characterized in particular by a reduced installation space as well as a lower weight and which can be produced in a cost-efficient manner, in particular by means of a simple production.

According to the invention, this problem is solved by means of the subject matter of the independent claim(s). Advantageous embodiments are the subject matter of the dependent claim(s).

The invention is based on the general idea of embodying a fluid pump, in particular for a motor vehicle, in such a way that an impeller is directly connected to a rotor receiving sleeve in a rotationally fixed manner. On the one hand, this has the advantage that the fluid pump is molded in an installation space-optimized manner and, on the other hand, that a metallic axle for transferring force from a rotor to the impeller, is not required, as a result of which the fluid pump has a reduced weight. For this purpose, the fluid pump for conveying fluid initially has such an internal rotor, which is supported so as to be capable of being rotated about an axis of rotation relative to an external stator, wherein the rotor has the rotor receiving sleeve, which has a base body comprising a receiving chamber for receiving an anchor unit. The anchor unit could have, for example, a laminated core, on which permanent magnets are arranged. The rotor further has a bearing bushing for receiving a rotor shaft, wherein the bearing bushing penetrates the rotor receiving sleeve coaxially to the axis of rotation. The fluid pump further comprises the impeller for conveying the fluid, which is connected to the rotor, in particular to the rotor receiving sleeve, in a rotationally fixed manner.

In the base body, the receiving chamber is advantageously open on an axial side, which faces the impeller, so that the anchor unit can be inserted axially on this axial side. To seal against the conveyed fluid, the receiving chamber is then closed. For this purpose, a cover can be used, which is a separate component with respect to the impeller and with respect to the base body.

Advantageously, the impeller can now be directly connected to the base body in a rotationally fixed manner, whereby a direct torque transmission between base body and impeller is made possible.

In the alternative, provision can be made for the impeller to be directly connected to the cover in a rotationally fixed manner, which, in turn, is connected to the base body in a rotationally fixed manner. This can lead to a simplified production, when for example the impeller can initially be fastened to the cover and when the cover comprising the impeller can subsequently be fastened to the base body.

In a possible embodiment variation of the idea according to the invention, the impeller is directly connected to the cover of the rotor receiving sleeve in a rotationally fixed manner. This means that the impeller does not inevitably need to be in contact with the base body of the rotor receiving sleeve as such.

An advantageous further development of the idea according to the invention provides for the impeller and the cover to be embodied in one piece or in particular monolithically respectively. In other words, the cover is integrally molded on the impeller in this case. This is also synonymous with the fact that the impeller simultaneously forms the cover as additional function. As a result, the impeller or the cover section thereof, respectively, closes the receiving chamber of the rotor receiving sleeve. It is particularly advantageous in this further development that the impeller is simultaneously connected to the rotor in a rotationally fixed manner when installing the impeller and thus the integrated cover, and that the receiving chamber of the rotor receiving sleeve is closed by means of the impeller or the cover section, respectively. By means of the one-piece or monolithic embodiment, respectively, of the impeller and of the cover, an operating step can be saved in the production process, because the impeller and the cover can be installed simultaneously to such a fluid pump and an individual installation of the impeller and of the cover is not necessary.

According to a preferred embodiment, the receiving chamber can be embodied in an annular manner and can be defined radially on the inside by a cylindrical inner wall of the base body and radially on the outside by a cylindrical outer wall of the base body. The anchor unit can thus be arranged in the base body independently and also without contact to the bearing bushing, which can simplify the production.

In a further development, provision can be made for the base body to have on its axial end, which faces away from the impeller, a bottom, which connects the inner wall to the outer wall. This means that the receiving chamber of the base body is open on the axial side, which faces the impeller, so that the anchor unit can be inserted on this axial side. Provision can preferably also be made for the base body to be produced in one piece with the inner wall, the outer wall and the bottom. The base body comprising inner wall, outer wall and bottom is thus also produced monolithically, e.g. as injection molded part.

An advantageous further development proposes for the impeller, which forms the cover, or which has the cover section, respectively, to be fastened to the inner wall by means of an internal welded connection and to the outer wall by means of an external welded connection.

Provision can further be made for the internal welded connection and the external welded connection to be arranged and designed or embodied in such a way, respectively, that they tightly close the receiving chamber to the outside with respect to the fluid. The rotor can thus be used as a wet rotor in a particularly simple manner.

In a further advantageous embodiment variation, the impeller is directly connected in a rotationally fixed manner to an impeller holder, which is embodied on the base body of the rotor receiving sleeve. On a side, which faces the impeller, the base body of the rotor receiving sleeve has such an impeller holder, which is in direct contact with the impeller and connects the latter to the rotor receiving sleeve in a rotationally fixed manner.

In an advantageous embodiment, the impeller holder is integrally molded on the base body of the rotor receiving sleeve. This means that the base body, together with the impeller holder, is embodied as one-piece component. The one-piece component of base body and impeller holder is preferably produced as a plastic injection molded part. The one-piece embodiment of said components facilitates the production and also reduces the costs due to the elimination of individual components.

For the improved integration of the rotor shaft in the rotor, provision can be made for the rotor shaft to be received in two bearing sleeves, which are axially spaced apart from one another, in such a way that an annular chamber is embodied radially between the bearing bushing and the rotor shaft. The coaxiality of the rotor shaft and the remaining rotor is hereby defined by means of the two bearing sleeves, which can lead to an increased production accuracy. This is attained in particular in that an inner cross section of the bearing sleeves is smaller than an inner cross section of the bearing bushing. In contrast, an outer cross section of the bearing shaft is substantially identical to the inner cross section of the bearing sleeves, thus also smaller than the inner cross section of the bearing bushing.

In an advantageous further development, the bearing bushing in each case has, on the longitudinal ends thereof, one of these bearing bushings, which are provided to receive the rotor shaft. The bearing bushings can be axially inserted into the bearing bushing at least partially and/or can be pressed together with the bearing bushing.

In the alternative, provision can also be made for the one bearing sleeve to be arranged on the bearing bushing on a longitudinal end of the bearing bushing, which faces away from the impeller, while the other bearing sleeve is arranged in or on the impeller, respectively, at an axial distance from the bearing bushing. The axial distance of the two bearing sleeves can thus be increased, which provides for a more accurate coaxial alignment of the rotor shaft to the remaining rotor.

A further advantageous embodiment provides for the rotor receiving sleeve to at least partially radially enclose the bearing bushing and in particular the bearing sleeves arranged on the bearing bushing at least on the outer jacket surface thereof, and/or for the rotor receiving sleeve to at least partially axially engage around the bearing bushing and in particular the bearing sleeves arranged on the bearing bushing. The rotor receiving sleeve can preferably at least be injected onto the bearing bushing in a production step prior to the injection of the rotor receiving sleeve, the rotor shaft is particularly preferably already radially pressed together with the bearing bushing with the help of the bearing sleeves, so that the bearing sleeves are also at least partially overmolded by the rotor receiving sleeve. Advantageously, the rotor shaft, the bearing bushing, the bearing sleeves and the rotor receiving sleeve are connected to one another in a rotationally fixed manner, resulting in a uniform rotational movement of the rotor with the rotor shaft. The rotationally fixed connection between the rotor receiving sleeve and the bearing bushing can for example be attained by means of a positive connection in the form of a notch of an otherwise cylindrical outer jacket surface of the bearing bushing. By an injection of the rotor receiving sleeve onto the bearing bushing, the bearing bushing is in direct and positive contact with the inner wall of the rotor receiving sleeve in the circumferential direction. In the context of the invention, any possible positive and/or frictional rotationally fixed connection between the rotor receiving sleeve and the bearing bushing is protected.

In an advantageous further development of the invention, the impeller holder of the rotor receiving sleeve has an annular collar on a side, which faces the impeller. On the one hand, the collar can serve as bearing surface for an impeller bearing thereon and, on the other hand, the protruding material in the form of the collar can be provided as a type of sacrificial material, which can be reserved for an advantageous welding point embodiment in response to a production process, in which the impeller is welded to the rotor receiving sleeve.

A further advantageous further development of the idea according to the invention provides for the impeller, on a side facing the impeller holder of the rotor receiving sleeve, to have an annular web, which is enclosed by two radially spaced apart annular grooves and on which the annular collar of the impeller holder is supported. The embodiment with the annular web and the annular grooves bearing thereon, can also lead to an optimized welded connection in the production process. The above-described sacrificial material in the form of the annular collar of the impeller holder can liquefy in such a way during a welding process that it runs into the annular grooves and thus forms the described optimized welded connection.

In an advantageous embodiment, the impeller has, on a side facing away from the annular web, a support surface, for example for receiving a sonotrode, which corresponds at least to a diameter, which is larger than/equal to the diameter of the annular web of the impeller. The support surface is advantageous in that a tool can be guided to the location, which is vacant for the subsequent connection, in response to a downstream production process, in which the impeller is welded to the rotor receiving sleeve. When welding the impeller to the rotor receiving sleeve by means of ultrasonic welding, such a sonotrode for example reaches the welding points provided on the components.

In an advantageous further development, the rotor, in particular the rotor receiving sleeve, on a side facing away from the impeller, has at least two positioning noses, which are arranged so as to in particular be shifted by 180° in the circumferential direction and which are arranged at least radially outside of the bearing bushing. The positioning noses protrude axially at least partially, so that they can be used to position and to determine the position of the rotor.

In an advantageous embodiment, the impeller has a concentric passage opening to the bearing bushing of the rotor.

The passage opening can be penetrated by such a rotor shaft. On the one hand, this has the advantage that the rotor shaft can be supported on a side of the impeller, which faces away from the rotor receiving sleeve, and, on the other hand, the rotor shaft can be inserted on both sides, which results in a simplified installation.

In a preferred embodiment, the impeller and at least the area of the impeller holder of the rotor receiving sleeve are made of an identical material. The preferred material from which the impeller and the impeller holder of the rotor receiving sleeve are made, is in particular a plastic.

A favored embodiment variation of the idea according to the invention provides for the rotationally fixed operative connection between the impeller holder on the rotor receiving sleeve and the impeller to be established by means of ultrasonic welding, rotational friction welding or laser beam welding. Particularly preferably, the operative connection between the impeller holder of the rotor receiving sleeve and the impeller is established by means of an ultrasonic welding process. In a further possible embodiment variation, the impeller is adhered to the impeller holder of the rotor receiving sleeve. In the context of the invention, it is likewise conceivable to establish the operative connection between the impeller and the rotor receiving sleeve of the rotor by means of a positive connection, in particular by means of a clipping or a pressing together.

A method according to the invention for installing an impeller on a rotor of an electric motor, in particular for an electrical fluid pump, provides for at least the below-mentioned step. First of all, the rotor is clamped and is suitably positioned with the help of the positioning nose. The impeller is then attached to the rotor receiving sleeve of the rotor and they are welded to one another by means of ultrasonic welding. During the welding process, a force/displacement measurement occurs to monitor the welding process.

Further important features and advantages of the invention follow from the subclaims, from the drawings, and from the corresponding figure description by means of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the description below, whereby identical reference numerals refer to identical or similar or functionally identical components.

BRIEF DESCRIPTION OF THE DRAWINGS

In each case schematically.

DETAILED DESCRIPTION

Figure 1:
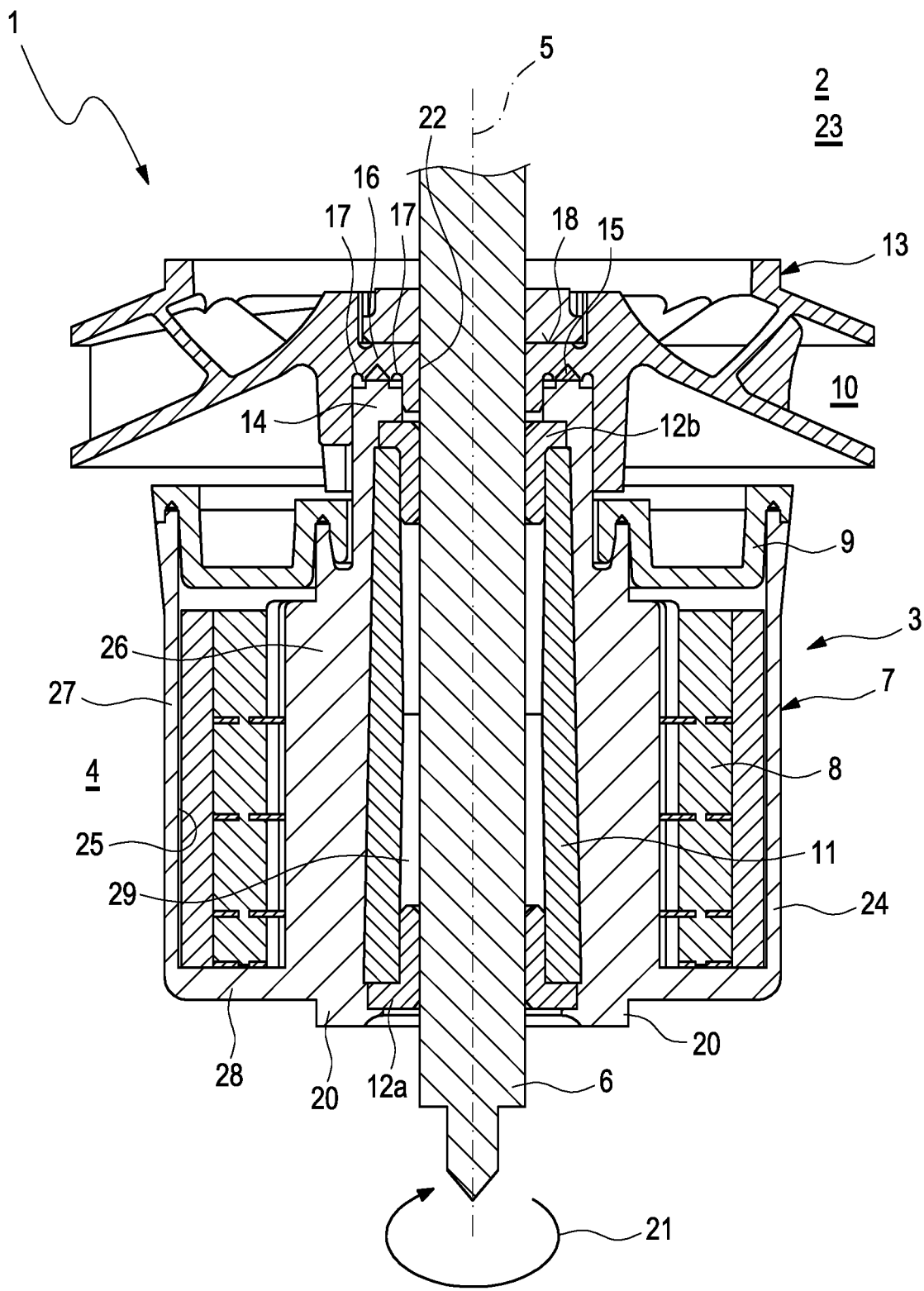
FIG. 1 shows a sectional illustration of the fluid pump according to the invention comprising an impeller arranged on a rotor receiving sleeve of a rotor.
Figure 6:
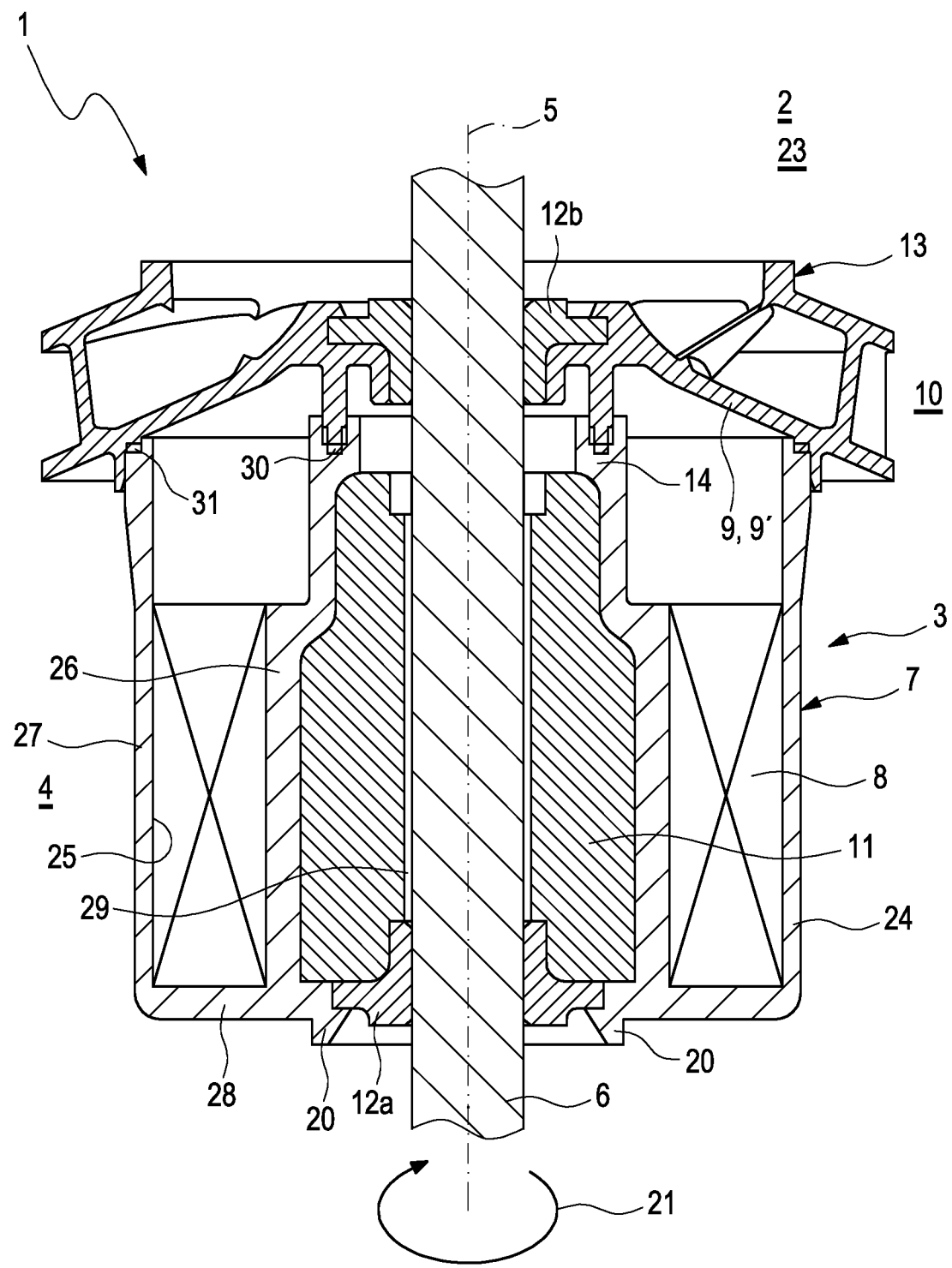
FIG. 6 shows a sectional illustration of the fluid pump as in FIG. 1, but in a different embodiment.

FIGS. 1 and 6 in each case show a sectional illustration of a fluid pump 1, in particular for a motor vehicle 2, which is otherwise not shown, which is formed at least of a non-illustrated electric motor 23 and an impeller 13 arranged thereon, for conveying a fluid 10. As is well-known, such an electric motor 23 can have an external stator 4, which is not illustrated in detail, and an internal rotor 3. The rotor 3 is supported so as to be capable of being rotated about an axis of rotation 5 relative to the stator 4 and comprises at least one rotor receiving sleeve 7. The rotor receiving sleeve 7 has a base body 24 comprising a receiving chamber 25 for receiving an anchor unit 8, and according to the embodiment shown in FIG. 1, a cover 9 for closing the receiving chamber 25. According to the embodiment shown in FIG. 6, this cover 9 is integrated into the impeller 13 or is formed by the impeller 13 itself, respectively, so that the impeller 13 quasi has a cover section 9'. The anchor unit 8 can for example have a laminated core and permanent magnets arranged on this laminated core. The cover 9 or the cover section 9', respectively, can hermetically seal the receiving chamber 25 and can thus protect such an anchor unit 8, which is arranged in the receiving chamber 25, against such a fluid 10. The rotor 3 further has a bearing bushing 11, which is provided to receive a rotor shaft 6 and which penetrates the rotor receiving sleeve 7 of the rotor 3 coaxially to the axis of rotation 5. According to the embodiment shown in FIG. 1, the rotor shaft 6 can be radially pressed with bearing sleeves 12a and 12b, which are in each case inserted on the longitudinal ends of the bearing bushing 11. The impeller 13 is connected to the rotor 3 in a rotationally fixed manner.

Figure 2:
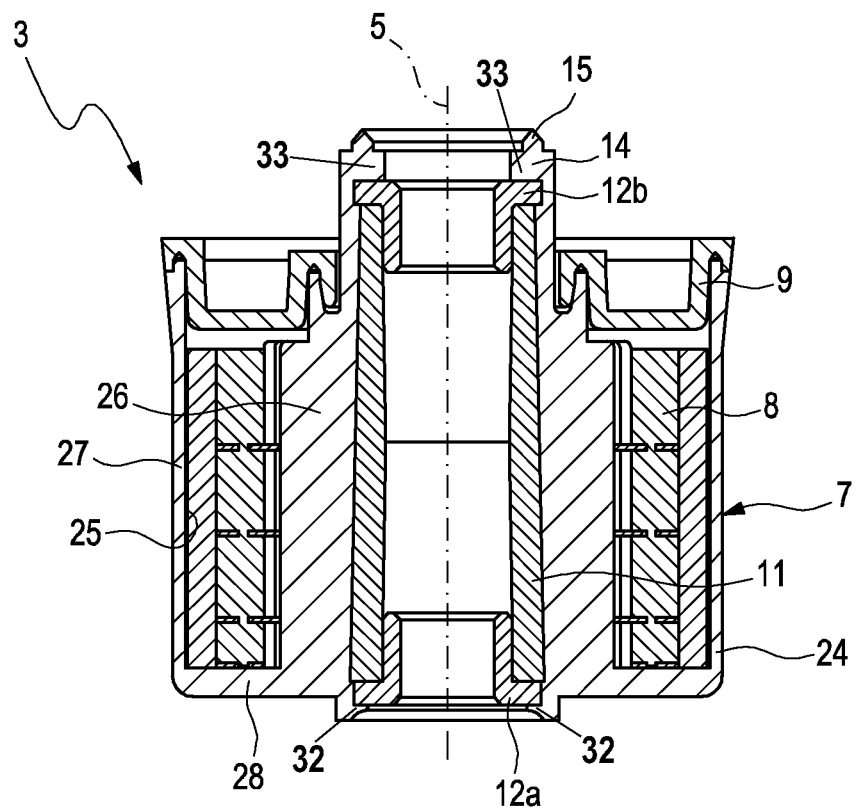
FIG. 2 shows a sectional illustration of the rotor, wherein the rotor receiving sleeve is injected onto a bearing bushing.

FIG. 2 shows a sectional illustration of the rotor 3, in which the rotor receiving sleeve 7 is injected onto a bearing bushing 11. It is important to note that the base body 24 of the rotor receiving sleeve 7 can substantially be meant when referring to an injection onto or an encasement of the rotor receiving sleeve 7 on such a bearing bushing 11 or on such a bearing sleeve 12a, 12b. According to FIG. 1, the bearing bushing 11 can in each case have such a bearing sleeve 12a, 12b on the longitudinal ends thereof, which is provided for receiving the rotor shaft 6 and with which the rotor shaft 6 can be pressed together radially. The rotor shaft 6, the bearing sleeves 12a, 12b and the bearing bushing 11 are connected to one another in a rotationally fixed manner. The rotor receiving sleeve 7 can at least partially radially enclose the bearing bushing 11 and in particular the bearing sleeves 12a, 12b, which are arranged on the bearing bushing 11, at least on the outer jacket surface thereof. The rotor receiving sleeve 7 can further at least partially axially engage around the bearing bushing 11 and in particular the bearing sleeves 12a, 12b (e.g., via a first radial projection 32 and/or a second radial projection 33), which are arranged on the bearing bushing 11. The rotor receiving sleeve 7 can be embodied as plastic injection molded part and can be directly injected onto the bearing bushing 11. In addition, the rotor receiving sleeve 7 and the bearing bushing 11 can advantageously be in a positive and/or frictional operative connection with one another. An impeller holder 14 can be arranged on a side of the rotor receiving sleeve 7, which faces an impeller 13, which is to be attached subsequently. The impeller holder 14 is preferably integrally molded on the rotor receiving sleeve 7. The impeller holder 14 of the rotor receiving sleeve 7 can have an annular collar 15 on a side, which faces the impeller 13. In the annular receiving chamber 25, the rotor receiving sleeve 7 can have the anchor unit 8 and can be hermetically sealed by means of such a cover 9 or cover section 9', respectively. The separate cover 9 can be connected to the rotor receiving sleeve 7 by means of ultrasonic welding, rotational friction welding or laser beam welding. The separate cover 9 can further be adhered to the rotor receiving sleeve 7 or can be pressed together with it.

Figure 3:
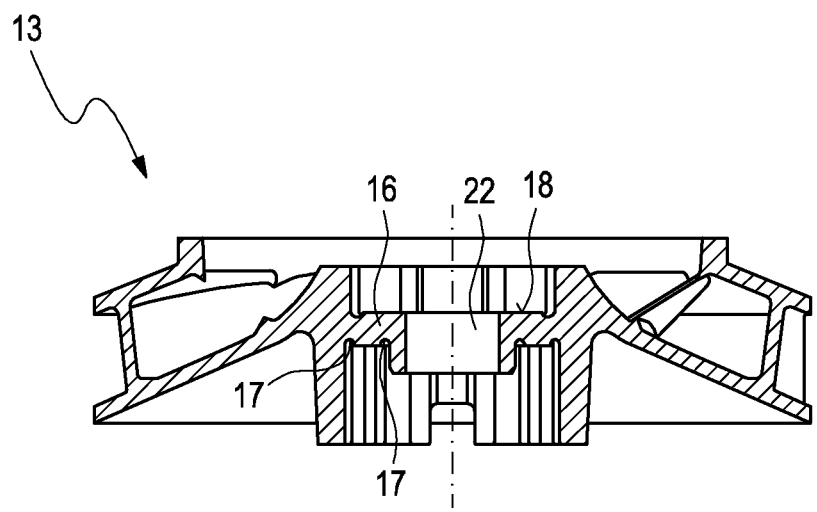
FIG. 3 shows a sectional illustration of the impeller comprising a concentric passage opening.

FIG. 3 shows a sectional illustration of the impeller 13 of a fluid pump 1 according to FIG. 1. On a side facing the impeller holder 14 of the rotor receiving sleeve 7, the impeller 13 can have an annular web 16, which is enclosed by two radially spaced apart annular grooves 17. The annular collar 15, which is not shown here, of the impeller holder 14 of the rotor receiving sleeve 7 can support itself on the annular web 16. On a side facing away from the annular web 16, the impeller 13 can furthermore have a support surface 18, which can for example be provided for receiving a sonotrode 19. The diameter of the support surface 18 advantageously corresponds at least to the diameter of the annular web 16 of the impeller 13 or at least to a diameter, respectively, which assumes an area of the operative connection between the impeller 13 and the rotor receiving sleeve 7. The impeller 13 can have a concentric passage opening 22 to the bearing bushing 11 of the rotor 3.

Figure 4:
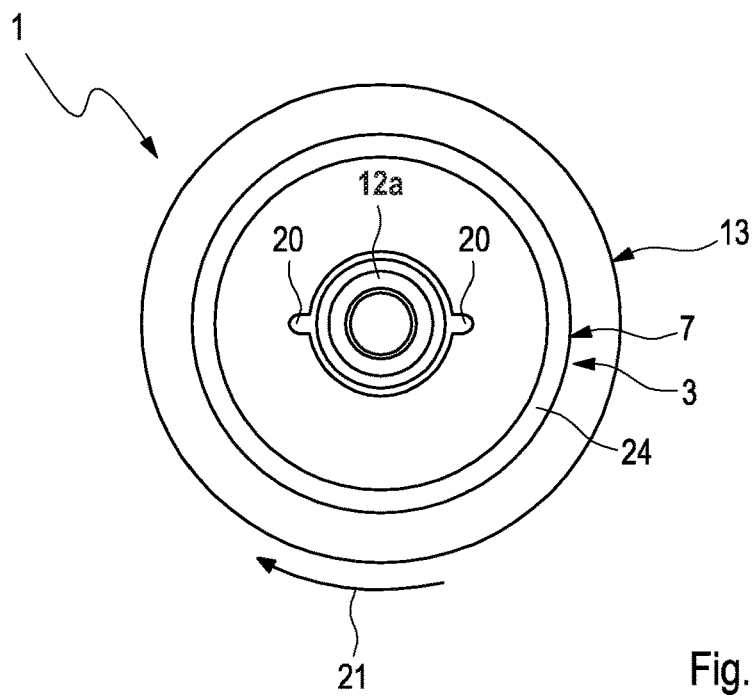
FIG. 4 shows an isometric view of the fluid pump from a side, which faces away from the impeller.

FIG. 4 shows an isometric view of the fluid pump 1 on an axial side, which faces away from the impeller 13. On a side, which faces away from the impeller 13, the rotor 3, in particular the rotor receiving sleeve 7, can have at least two positioning noses 20, which are arranged so as to be shifted for example by 180° in the circumferential direction 21 and which are arranged at least radially outside of the bearing bushing 11. The positioning noses 20 protrude at least partially axially from the rotor receiving sleeve 7.

Figure 5:
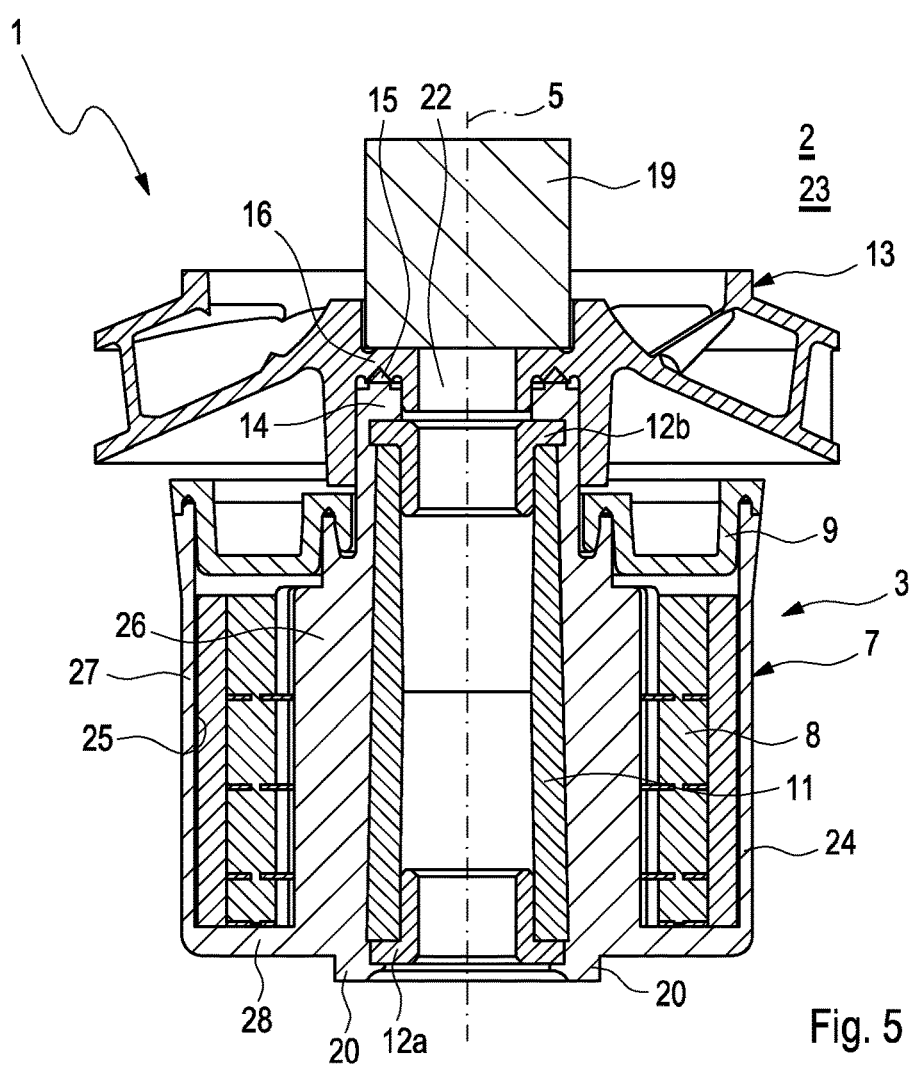
FIG. 5 shows a sectional illustration of the rotor with arranged impeller and a schematically suggested sonotrode.

FIG. 5 shows a sectional illustration of the rotor 3 with arranged impeller 13 and a schematically suggested sonotrode 19, which is mentioned further above. The impeller 13 and preferably the area of the impeller holder 14 of the rotor receiving sleeve 7 can preferably be made of an identical material, in particular of a plastic. A desired rotationally fixed operative connection between the impeller holder 14 on the rotor receiving sleeve 7 and the impeller 13 can be established by means of ultrasonic welding, rotational friction welding or laser beam welding. The impeller 13 can further be adhered to the impeller holder 14 of the rotor receiving sleeve 7. In addition, the operative connection between the impeller 13 and the rotor 3, in particular the rotor receiving sleeve 7, can be established by means of a positive connection, which is brought about in particular by means of a clipping or a pressing together.

As mentioned, the receiving chamber 25 in the base body 24 is advantageously open on an axial side, which faces the impeller 13, so that the anchor unit 8 can be inserted axially on this axial side. To seal with respect to the conveyed fluid 10, the receiving space 25 is closed in the assembled state of the rotor 3. For this purpose, said cover 9 can be used, which is a separate component with respect to the impeller 13 and with respect to the base body 24.

In a non-illustrated embodiment, provision can be made for the impeller 13 to be directly connected to the separate cover 9 in a rotationally fixed manner, which cover, in turn, is connected to the base body 24 in a rotationally fixed manner.

FIG. 6 now shows an embodiment, in which the impeller 13 and the cover 9 are embodied in one piece. In other words, the cover 9 is integrally molded on the impeller 13 in this case. This is also synonymous with the fact that the impeller 13 simultaneously forms the cover as additional function. As a result, the impeller 13 has said cover section 9'. In FIG. 6, the impeller 13 or the cover section 9' thereof, respectively, thus closes the receiving chamber 25 of the rotor receiving sleeve 7.

According to FIGS. 1, 2, 5 and 6, the receiving chamber 25 is embodied annularly and is defined by a cylindrical inner wall 26 of the base body 24 radially on the inside and by a cylindrical outer wall 27 of the base body 24 radially on the outside. The anchor unit 8 thus does not have any contact with the bearing bushing 11.

On its axial end, which faces away from the impeller 13, the base body 24 preferably has a bottom 28, which connects the inner wall 26 to the outer wall 27. This means that the receiving chamber 25 of the base body 24 is open on the axial side facing the impeller 13, so that the anchor unit 8 can be inserted on this axial side. Provision can preferably also be made for the base body 24 comprising the inner wall 26, the outer wall 27, and the bottom 28, to be produced in one piece. The base body 24 comprising inner wall 26, outer wall 27 and bottom 28 is thus also produced monolithically, e.g. as injection molded part. The above-mentioned positioning noses 20 can be integrally molded on this bottom 28.

According to Fig., the impeller 13, which forms the cover 9 or which has the cover section 9', respectively, can be fastened to the inner wall 26 by means of an internal welded connection 30 and to the outer wall 27 by means of an external welded connection 31. The external welded connection 31 seals the receiving chamber 25 to the outside with respect to the fluid 10, which surrounds the rotor 3. The internal welded connection 30 also seals the receiving chamber 25 to the outside with respect to the fluid 10, which can enter into the chamber, which is enclosed by the inner wall 26, along the rotor shaft 6 past the bearing sleeves 12a, 12b.

According to the embodiments of FIGS. 1, 2, 5 and 6 shown here, provision can be made for the two bearing sleeves 12a, 12b, which are axially spaced apart from one another, for the improved integration of the rotor shaft 6 into the rotor 3. The two bearing sleeves 12a, 12b are thereby embodied and are adapted to the rotor shaft 6 and the bearing bushing 11 in such a way that an annular chamber 29 is formed radially between the bearing bushing 11 and the rotor shaft 6.

In the examples of FIGS. 1, 2 and 5, the two bearing sleeves 12a, 12b are arranged on the two longitudinal ends of the bearing bushing 11. In the example shown in FIG. 6, in contrast, provision is made for the one bearing sleeve 12a to be arranged on the bearing bushing 11 on a longitudinal end of the bearing bushing 11, which faces away from the impeller 13, while the other bearing bushing 12b is arranged in or on the impeller 13, respectively, axially spaced apart from the bearing bushing 11. The axial length of the rotor 3 comprising impeller 13 can thus be reduced.

The invention claimed is:
1. A fluid pump, comprising:
an internal rotor rotatable about an axis of rotation relative to an external stator;
an impeller connected to the internal rotor in a rotationally fixed manner for conveying a fluid;
the internal rotor including a rotor receiving sleeve, the rotor receiving sleeve including a base body having a receiving chamber configured to receive an anchor unit;
the internal rotor further including a bearing bushing structured and arranged to penetrate the rotor receiving sleeve coaxially to the axis of rotation, the bearing bushing configured to receive a rotor shaft;

wherein the impeller is directly connected to the rotor receiving sleeve in a rotationally fixed manner;
wherein the base body defines the receiving chamber such that receiving chamber opens toward the impeller; and
wherein the rotor receiving sleeve, on a side facing away from the impeller, includes at least two positioning noses, the at least two positioning noses arranged equidistant from one another in a circumferential direction of the axis of rotation and disposed radially outside of the bearing bushing.

2. The fluid pump according to claim 1, wherein the receiving chamber is closable by a cover, and the cover is a separate component from the impeller.

3. The fluid pump according to claim 2, wherein the impeller is directly connected to the base body in a rotationally fixed manner.

4. The fluid pump according to claim 1, wherein the receiving chamber is closable by a cover and the impeller is directly connected to the cover in a rotationally fixed manner.

5. The fluid pump according to claim 4, wherein the impeller and the cover are integrally provided as a single piece.

6. The fluid pump according to claim 1, wherein:
the base body includes a bottom, a cylindrical inner wall, and a cylindrical outer wall;
the cylindrical inner wall and the cylindrical outer wall project from the bottom toward the impeller such that the bottom at least partially defines an axial end of the base body opposite the impeller; and
the receiving chamber is defined by the cylindrical inner wall, the cylindrical outer wall, and the bottom such that the receiving chamber is annular.

7. The fluid pump according to claim 6, wherein the cylindrical inner wall, the cylindrical outer wall, and the bottom are integrally provided as a single piece such that the base body is a monolithic structure.

8. The fluid pump according to claim 6, wherein:
the impeller is coupled to the cylindrical inner wall of the base body via an internal welded connection and to the cylindrical outer wall of the base body via an external welded connection; and
the internal welded connection and the external welded connection fluidically seal the receiving chamber.

9. The fluid pump according to claim 6, further comprising a cover arranged on the rotor receiving sleeve closing the receiving chamber, wherein:
the cylindrical inner wall and the cylindrical outer wall each include an axial protrusion projecting therefrom toward the impeller; and
the axial protrusion of the cylindrical inner wall engages a complimentary inner receptacle of the cover and the axial protrusion of the cylindrical outer wall engages a complimentary outer receptacle of the cover.

10. The fluid pump according to claim 9, wherein at least a portion of the cover extends into the receiving chamber between the axial protrusion of the cylindrical inner wall and the axial protrusion of the cylindrical outer wall.

11. The fluid pump according to claim 1, wherein the impeller is directly connected in a rotationally fixed manner to an impeller holder disposed on the base body.

12. The fluid pump according to claim 11, wherein the impeller holder is integrally molded on the base body.

13. The fluid pump according to claim 11, wherein:
the impeller holder includes an annular collar on a side facing the impeller; and
the annular collar engages a complimentarily structured recess of the impeller.

14. The fluid pump according to claim 11, wherein the impeller includes an annular web on a side of the impeller facing the impeller holder, the annular web enclosed by two radially spaced apart annular grooves and configured to support an annular collar of the impeller holder.

15. The fluid pump according to claim 14, wherein the impeller has a support surface on a side facing away from the annular web, the support surface having a diameter that is equal to or larger than a diameter of the annular web.

16. The fluid pump according to claim 1, further comprising two bearing sleeves arranged axially spaced apart from one another and configured to receive the rotor shaft, the two bearing sleeves arranged such that an annular chamber is defined radially between the bearing bushing and the rotor shaft when the rotor shaft is received within the bearing bushing and the two bearing sleeves.

17. The fluid pump according to claim 16, wherein the two bearing sleeves are arranged on opposing longitudinal ends of the bearing bushing.

18. The fluid pump according to claim 16, wherein a first bearing sleeve of the two bearing sleeves is arranged on a longitudinal end of the bearing bushing facing away from the impeller and a second bearing sleeve of the two bearing sleeves is arranged in the impeller at an axial distance from the bearing bushing.

19. The fluid pump according to claim 18, wherein:
the rotor receiving sleeve includes a first radially projection and a second radial projection that extend toward the axis of rotation;
at least a portion of the first bearing sleeve is disposed axially between and in abutment with the first radial projection and the bearing bushing; and
at least a portion of the second bearing sleeve is disposed axially between and in abutment with the second radial projection and the bearing bushing.

20. The fluid pump according to claim 1, wherein the rotor receiving sleeve at least one of:
at least partially radially encloses the bearing bushing at least on an outer jacket surface thereof; and
at least partially axially engages around the bearing bushing.

21. The fluid pump according to claim 1, wherein:
the rotor receiving sleeve is a plastic injection molded part;
the rotor receiving sleeve is secured via direct injection onto the bearing bushing; and
the rotor receiving sleeve and the bearing bushing are operatively connected via at least one of a positive connection and a frictional connection.

22. The fluid pump according to claim 1, wherein the at least two positioning noses includes two positioning noses arranged offset by 180° in the circumferential direction of the axis of rotation.

23. The fluid pump according to claim 1, wherein the impeller includes a passage opening concentric to the bearing bushing.

24. The fluid pump according to claim 1, wherein at least one of:
the rotor receiving sleeve is connected to the impeller via at least one of ultrasonic welding, rotational friction welding, and laser beam welding;
the impeller is adhered to the rotor receiving sleeve; and
the impeller is connected to the rotor receiving sleeve via a positive connection.

25. A fluid pump, comprising:

an internal rotor rotatable about an axis of rotation relative to an external stator;

an impeller connected to the internal rotor in a rotationally fixed manner for conveying a fluid;

the internal rotor including a rotor receiving sleeve, the rotor receiving sleeve including a base body having a receiving chamber configured to receive an anchor unit;

the internal rotor further including a bearing bushing structured and arranged to penetrate the rotor receiving sleeve coaxially to the axis of rotation, the bearing bushing configured to receive a rotor shaft;

wherein the impeller is directly connected to the rotor receiving sleeve in a rotationally fixed manner;

wherein the base body includes a bottom, a cylindrical inner wall, and a cylindrical outer wall;

wherein the cylindrical inner wall and the cylindrical outer wall project from the bottom toward the impeller such that the bottom at least partially defines an axial end of the base body opposite the impeller;

wherein the receiving chamber is defined by the cylindrical inner wall, the cylindrical outer wall, and the bottom such that the receiving chamber is annular;

wherein a cover is arranged on the rotor receiving sleeve closing the receiving chamber;

wherein the cylindrical inner wall and the cylindrical outer wall each include an axial protrusion projecting therefrom toward the impeller; and wherein the axial protrusion of the cylindrical inner wall engages a complimentary inner receptacle of the cover and the axial protrusion of the cylindrical outer wall engages a complimentary outer receptacle of the cover.

26. A fluid pump, comprising:

an internal rotor rotatable about an axis of rotation relative to an external stator;

an impeller connected to the internal rotor in a rotationally fixed manner for conveying a fluid;

the internal rotor including a rotor receiving sleeve, the rotor receiving sleeve including a base body having a receiving chamber configured to receive an anchor unit;

the internal rotor further including a bearing bushing structured and arranged to penetrate the rotor receiving sleeve coaxially to the axis of rotation, the bearing bushing configured to receive a rotor shaft;

wherein the impeller is directly connected to the rotor receiving sleeve in a rotationally fixed manner;

wherein the impeller is directly connected in a rotationally fixed manner to an impeller holder disposed on the base body; and wherein the impeller includes an annular web disposed on a side of the impeller facing the impeller holder, the annular web enclosed by two radially spaced apart annular grooves and configured to support an annular collar of the impeller holder.

* * * * *